United States Patent Office 3,101,276
Patented Aug. 20, 1963

3,101,276
PROCESS FOR GRAFTING POLYMERS TO CELLULOSE SUBSTRATES
Robert William Hendricks, Claymont, Del., assignor to E. I. du Pont de Nemours and Company, Wilmington, Del., a corporation of Delaware
No Drawing. Filed July 8, 1957, Ser. No. 670,369
9 Claims. (Cl. 117—56)

This invention relates to irradiation grafting of polymers to substrates and more particularly to an improvement in the polymer-grafting of cellulose substrates by the ionizing irradiation technique.

Recently it has been shown that polymers of ethylenically unsaturated polymerizable monomers may be formed in situ and affixed, i.e., grafted, to cellulose base materials by the action of ionizing radiation, applied either after or, in some instances, before the ethylenically unsaturated polymerizable monomer is placed in contact with the cellulose substrate. However, the efficiency of utilization of the ionizing radiation is extremely low, because the amount of available ethylenically unsaturated polymerizable monomer actually polymerized and grafted (i.e., chemically bonded) to the cellulose substrates is very slight. Thus, radiation-induced grafting of monomeric polymerizable compounds to cellulose as a means of obtaining desired property modification has been difficult to achieve, even by using such high radiation doses that heavy degradation resulted in the cellulose substrates.

An object of this invention, therefore, is to provide for the more efficient utilization of ionizing radiation in the grafting of polymers to cellulose substrates. Another object is to provide an improved process for forming and grafting to a cellulose substrate a polymer resulting from the polymerization of an ethylenically unsaturated monomer with the aid of ionizing radiation. A more specific object is to provide for the efficient utilization of ionizing radiation in grafting to regenerated cellulose film with polymers formed in situ from ethylenically unsaturated monomers. The foregoing and related objects will more clearly appear hereinafter.

The term "cellulose substrate" as used in this specification is intended to cover structures of native cellulose such as wood, wood pulp, paper, cotton structures, etc., as well as structures such as films, filaments, tubing, etc., of regenerated cellulose obtained, for example, by the well known viscose or cupra-ammonium process.

By the term "grafting," as used in this specification, it is meant that polymer formed is chemically bonded to the cellulose, and that the polymer is in the interstices as well as on the surface of the cellulose, depending upon the degree of penetration of monomer into the cellulose substrate.

The objects hereinabove stated are realized by the present invention which, briefly stated, comprises, in the process of forming and grafting polymers to cellulose substrates wherein a cellulose substrate is subjected to ionizing radiation and an ethylenically unsaturated monomer is brought into contact with said substrate and is polymerized in situ as a result of the action of said ionizing radiation, the improvement which comprises swelling the substrate by incorporating therein at least 15% by weight, based on the weight of substrate, of a water-soluble, non-polymerizable swelling agent for cellulose, and thereafter subjecting said substrate to said ionizing radiation.

The term "water-soluble" swelling agent as employed herein is intended to cover water itself, as well as non-polymerizable water-soluble acids, bases, and salts which serve to swell cellulose, and which are soluble in effective proportions, and swelling agents which are miscible with water.

Swelling is a characteristic which is closely associated with most cellulose reactions. A solid is said to swell when it imbibes liquid while at the same time, its dimensions are enlarged, its cohesion is diminished, and it does not lose its apparent homogeneity. Cellulose fulfills all of the conditions for complex swelling and associated phenomena. The type and extent of swelling for any given condition depends upon the nature of the swelling agent, its specific interaction with cellulose, and the nature of the order-disorder structure of the cellulose sample. An example of cellulose swelling is the swelling of cellulose in water. As soon as water absorption begins, the cellulose starts to swell; the swelling increases in regular fashion as the total absorbed water increases and obtains its maximum value upon immersion of cellulose in excess water. Swelling beyond the water-swollen dimension takes place when the celluloses are immersed in certain aqueous solutions of acids, bases, or salts. The order of swelling power of the salts follow the well known lyotropic series, the more hydrated ions being the most effective swelling reagents. The decreasing order of swelling for the various cations and anions are as follows: [1]

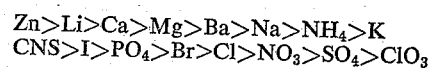

Swelling beyond the water-swollen conditions is also caused by aqueous solutions of various organic compounds such as thiourea, chloralhydrate, resorcinol, and benzenesulfonates.

In the process of this invention, the swelling agent is preferably a liquid, although it may be vapor, and is incorporated into the cellulosic shaped article prior to irradiation. The means used to accomplish this incorporation are not critical as long as the swelling agent is uniformly incorporated into the cellulosic material. In most cases, it is simplest to soak the cellulosic material in the swelling agent until the desired amount of swelling agent has been incorporated into the cellulosic material. This method is particularly useful with cellulosic substrates, such as films and filaments. (Details of Swelling Mechanisms of Cellulose, see High Polymers, vol. V, 2d ed., Cellulose, Ott; Spurlin, part I, pages 317–338.)

It is essential that at least 15% by weight of swelling agent be incorporated in the cellulose substrate in order to insure a positive swelling action over and above that incident to the normal moisture content of the substrate due to atmospheric conditions.

The preferred swelling agents in this invention are those materials which are liquid at temperatures in the range of 0°–50° C., i.e., the range in which the effect of radiation is at the maximum. Typical examples of such agents are aqueous systems, such as 10% caustic, 10% acid, water alone, water-glycerol, aqueous salt solutions, as well as organic systems, such as ethanol, $ZnCl_2$-methanol, glycerol, glycerol-toluene, glycerol-urea, ammonium sulfamate and/or combinations thereof.

The term "ionizing radiation" is meant to include both radiation in the form sometimes regarded as particle radiation and radiation in the form sometimes regarded as ionizing electromagnetic radiation.

By "particle radiation" is meant an emission of accelerated electrons or nuclear particles such as protons, neutrons, alpha particles, deuterons, beta particles, or the like, so that said particles impinge upon the cellulosic material undergoing irradiation. The charged particles may be accelerated by means of a suitable voltage gradient, using such devices as a cathode ray tube, a resonant cavity accelerator, a Van de Graaff accelerator, ---
[1] High Polymers, vol. V, 2nd Ed., Cellulose, Ott; Spurlin, part I, page 319.

a betatron, a synchrotron, cyclotron, or the like, as is well known to those skilled in the art. Neutron radiation may be produced by bombardment of selected light metal (e.g., beryllium) targets with high energy positive particles. In addition, particle radiation suitable for carrying out the process of the invention can be obtained from an atomic pile, or from radioactive isotopes or from some other natural or artificial radioactive materials.

By "ionizing electromagnetic radiation" is meant radiation of the type produced when a metal target (e.g., tungsten) is bombarded by electrons possessing appropriate energy. Such radiation, conventionally termed X-ray, will have a short-wave length and a spectral distribution of energy at longer wave lengths determined by the target material and applied voltage. In addition to X-rays produced as indicated above, ionizing electromagnetic radiation suitable for carrying out the process in the invention can be obtained from a nuclear reaction ("pile") or from natural or artificial radioactive material (e.g., cobalt 60). In all of these latter cases, the radiation is conventionally termed gamma rays. While gamma radiation is distinguished from X-radiation only with reference to its origin, it may be noted that the spectral distribution of X-rays is different from that of gamma rays, the latter frequently being essentially monochromatic, which is not the case with X-rays produced by electron bombardment of a target.

It is recognized that the energy characteristics of one form of ionizing radiation can be expressed in terms which are appropriate for another form. Thus, it is acceptable to refer to energy equivalents between, for example, radiation commonly considered particle radiation and radiation commonly considered as wave or electromagnetic radiation. In the latter case, reference can be made to the energy of the individual photons. In the process of this invention, radiation which has an energy equivalent of an electron beam of at least 0.1 mev. (million electron volts) may be employed. Radiation with energy equivalent to an electron beam of 0.75 mev. to 2 mev. to 5 mev. is preferred where radiation of this energy is available at low cost and provides adequate penetration for the process. Radiation with an energy equivalent to an electron beam of 0.75 mev. and over (i.e., 0.75 mev. up to 2 and 5 mev.) is preferred where high penetration is desired. This may be particularly desirable in continuous operation. Thus, the choice of radiation energy level in excess of 0.75 mev. will depend upon the cost and penetration desired.

A minimum exposure of ionizing radiation of at least 0.001 watt-sec./cm.$^2$ of the swollen cellulosic material is necessary since lower degrees of exposure do not give adequate activation for initiating polymerization and grafting. The amount of polymerization and grafting in the contacting step usually increases with increasing degrees of exposure. Upper exposure limits depend on the amount of polymerization and grafting desired and on the radiation reactivity of the polymerizable monomer, as well as the stability of the base film. Exposures as high as 500–1000 watt-sec./cm.$^2$ may be employed; however, exposures greater than 125 watt-sec./cm.$^2$ usually result in heavy degradation of the cellulosic material. The exposure may be carried out at one slow pass or in several faster ones and may be conducted at any convenient amperage.

The temperature at which the irradiation step is carried out may be varied widely; irradiation temperatures, preferably, are within the range between the melting and boiling point of the swelling agent; but more specifically, in the range of 0°–50° C., since the maximum effect of the radiation is obtained in this temperature range. However, the temperature should not exceed the degradation temperature of the swollen cellulosic material and of polymerizable monomer present.

As examples of principal types of ethylenically unsaturated monomeric compounds useful in the present invention, there may be mentioned the monomeric unsaturated polymerizable compounds in which the unsaturation is due to terminal ethylenic groups, acrylic and methacrylic acids, esters, nitriles, and amides—for example, acrylonitrile, glycidyl methacrylate, methylmethacrylate; vinyl and vinylidene halides, e.g., vinyl chloride, vinyl fluoride, vinylidene chloride, vinylidene fluoride, vinyl carboxylates, e.g., vinyl acetate, vinyl trimethylacetate; vinly aryls, e.g., styrene and vinyl naphthalene; and other vinyl derivatives such as methyl vinyl ketone, vinyl isobutyl ether and vinyl ethyl ether. Olefins, such as ethylene and isobutylene as well as mixtures of ethylenically unsaturated monomeric compounds such as ethylene/vinyl chloride, acrylonitrile/isobutylene, ethylene/vinyl acetate, isobutylene/vinyl acetate, vinyl acetate/allylidene diacetate, vinyl acetate/vinyl methyl ether may also be grafted to cellulose substrates by the present process of this invention.

The preferred ethylenically unsaturated monomers are those of the formula:

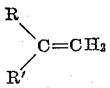

where R is selected from the group consisting of (a) the halogens, (b)

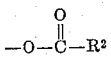

where R$^2$ may be H, or an alkyl or aryl group, (c) —CN, (d)

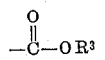

where R$^3$ is an alkyl or aryl group, and (e) —OR$^4$, where R$^4$ is an alkyl or aryl group, and R′ is selected from the group consisting of H, the halogens, alkyl and aryl groups.

The polymerizable ethylenically unsaturated monomer may be in contact with the swollen cellulosic substrate during irradiation, but its presence at that time is not essential. The radiation activates the swollen cellulosic substrate toward polymerization and grafting of the monomer, and, if the polymerizable monomer is applied within the period during which the swollen cellulosic substrate remains active, grafting of the polymerizable monomer takes place. The time which may elapse between irradiation and the contacting step will vary with radiation exposure, temperature, atmosphere of the storage, and the chemical nature of the polymerizable monomer. A storage time of not over 5 minutes between steps is usually preferred, and substantially immediate contact (less than one second) is frequently desirable. It has been observed, however, that the effects of the irradiation can be sustained for longer periods of time i.e., weeks and even months, if the irradiated swollen cellulosic substrate is kept in an inert atmosphere such as under nitrogen, argon, helium, or the like and/or stored at low temperatures such as at −80° C. In general, the lower the temperature at which the irradiated swollen cellulosic substrate is stored, the longer time the swollen cellulosic substrate remains active toward polymerization and grafting of the polymerizable monomer. It is thus possible to irradiate the swollen cellulosic substrate at a site of available irradiation and then, by maintaining suitable storage conditions, to ship the irradiated swollen cellulosic substrate to another site for carrying out the contacting step. However, the grafting yield at a given radiation exposure is greater when the polymerizable monomer is in contact during radiation and, for economic reasons, this represents the preferred practice of this invention.

It may be desirable to incorporate an organic softener into the aqueous swelling agent (e.g., glycerol/water solutions are used as softeners for regenerated cellulose film and therefore a solution of this type could also be employed as a swelling agent wherein the water is more readily removed in the final step than the glycerol, thus avoiding the need of having to add glycerol in an additional operation in the manufacture of regenerated cellulose film). Softeners such as disclosed in King U.S. Patent No. 2,074,-336, Underwood U.S. Patent No. 2,074,349, Snyder U.S. Patent No. 2,087,008, and Rothrock U.S. Patent No. 2,328,679 may, if desired, be incorporated prior to irradiation and grafting without adversely affecting the process of the present invention.

Cellulosic materials pretreated with anchoring agent resins, such as a urea-aldehyde resin, phenol-formaldehyde resin, ketone-aldehyde resin, amine modified urea-aldehyde resin, alcohol modified urea-aldehyde resin, etc., disclosed, for example, in Charch and Bateman U.S. Patent No. 2,159,007, Pitzl U.S. Patent No. 2,432,542, Chapman U.S. Patent No. 2,533,557, and Wooding U.S. Patent No. 2,546,575, as well as organic titanium compounds, disclosed, for example, in U.S. patent applications of Brill, S.N. 378,175, filed September 2, 1953, now abandoned, Brill S.N. 489,800, filed February 21, 1955, now U.S. Patent No. 2,943,955, and Haslam U.S. Patent No. 2,768,909, may be employed without detrimentally affecting the process of the invention.

It has been found that the grafting are primarily attached to the substrate and that the swelling agent may be subsequently removed with essentially no loss of the graftings. This makes it possible to greatly increase the efficiency of radiation by employing large amounts of swelling agents (which might undesirably affect the grafted substrate if left in place) and, removing part or all of the swelling agent by any convenient expedient. Any unreacted or ungrafted material may be extracted by employing a solvent for the swelling agent which is also a solvent for the unreacted or ungrafted material. This procedure is convenient, but is not essential to the process. Mechanical removal—such as by heat and/or vacuum are of particular advantage in the case of aqueous systems.

The specific form or shape of the swollen cellulose substrate employed is not a factor in the invention. It may be a film as illustrated in the following examples, or it may be a molded object, fiber, knitted or woven fabric, tube, extruding molding, or the like. Of particular advantage, however, are native cellulose, wood pulp, lumber, vulcanized fiber board, film, fiber, fabric, and various extruded forms, since they are readily adaptable to continuous operation according to the process of this invention.

In the continuous manufacture of regenerated cellulose film, such as disclosed in Brandenberger U.S. Patent No. 1,548,864, the process of the invention may be employed as an integral part of the continuous manufacture. For example, the gel regenerated cellulose film (swollen 200–350% with water and/or water-softener) may be then passed into a liquid monomer bath and then substantially immediately thereafter irradiated prior to the modified gel regenerated cellulose film passing through the conventional dryer, thus reducing the modified film to the desired moisture and softener content.

The following specific examples will further serve to illustrate the principles and practice of this invention. Percentage compositions are by weight unless otherwise indicated:

EXAMPLE 1

A weighed strip (87.3 mg.) of regenerated cellulose film (conditioned to room temperature and humidity, unsoftened and unsized), 0.0013″ thick was soaked for approximately 10 minutes in an aqueous 10% NaOH solution, then thoroughly rinsed in tap water, reweighed (246 mg.) and placed in a cell consisting of thin glass plates spaced with strips of 7½ mil "Mylar" (Du Pont polyester film). The preswelling represented a 182% weight gain over the original dry weight. A second weighed strip of identical regenerated cellulose film not soaked or otherwise conditioned was placed in another cell; then both cells were filled with vinyl acetate and sealed. The cells were given 5 standard passes in the Van de Graaff accelerator (a "standard" pass consisting of a sample passing under an electron beam at a speed of 2 cm./sec., using a scan width of 20 cm., sample-to-window distance of 10 cm., beam current of 250 microamperes, an electron energy of 2 mev.). Under the conditions used, one standard pass is equivalent to approximately 1.5 megarads in the irradiated film and total exposure was 62.5 watt-sec./cm.$^2$. No external cooling was used during irradiation. The samples were removed from the cells and soaked overnight in methylethyl ketone, a solvent for polyvinyl acetate to remove the ungrafted homopolymer. After a final acetone rinse, the films were dried in a vacuum drying oven at 90° C. for 1.5 hours at 0.1 mm., and then conditioned to room humidity and weighed; >98% of the swelling agent was removed. The originally swollen irradiated sample was found to have increased in weight (127.3 mg.) by 46%, based on the original dry weight, while the originally unsoaked irradiated sample lost 2.6% in weight.

Infra-red spectra analyses were run on both the samples—the originally swollen sample possessed a very strong band at 7.5μ, characteristic of polyvinyl acetate, in the spectra, while the spectrum of the originally unswollen sample showed no band at this wave length.

EXAMPLE 2

Weighed strips of regenerated cellulose film were treated as in Example 1, except that vinylidene chloride, freed of inhibitor by washing with caustic, was used in the cells, which were given 5 standard passes while being cooled by a wet ice bath. The presoaked sample had a 180% weight gain. After mechanical removal of a deposit of homopolymer, overnight extraction with dioxane, oven drying, and conditioning at room temperature, the films were weighed; >98% of the swelling agent was removed. The originally swollen film had increased in weight by 5.5% while the unswollen film had lost 1.8% in weight.

EXAMPLE 3

Weighed strips of regenerated cellulose film were treated as in Examples 1 and 2, except that distilled acrylonitrile was used as the monomer. The cell containing the preswollen film, 182% weight gain, was given one standard pass without external cooling, after extraction in hot dimethyl formamide, drying, conditioning, and weighing, it was found that the originally preswollen sample had gained 14.7% in weight based on the original dry weight. The film had >98% of the swelling agent removed. The second, unswollen film, given 5 standard passes, was not extracted, but after drying and conditioning, and reweighing, had gained only 3.9% by weight. Infra-red spectra analyses were run on both the samples—these originally swollen showed a strong band at 4.45μ, characteristic of polyacrylonitrile, while the unswollen sample contained no band at this wave length.

EXAMPLE 4

Two strips of regenerated cellulose film (A and B) were weighed. Film A was swollen in 10% aqueous HCl for approximately 10 minutes, then rinsed with water as in the preceding examples and had a 45% weight gain; film B was merely soaked in water for approximately 10 minutes and had a 104% weight gain. The films were irradiated in cells filled with vinyl acetate as in Example 1, using 5 standard passes without external cooling, and were then extracted, dried, conditioned, and weighed as in Example 1. Film A gained 59%, and film B had gained 51%. Films A and B had 100% of the swelling agent removed. Infra-red spectra analyses were run on both samples and in each case, the samples showed a very strong band at 5.7μ, characteristic of polyvinyl acetate in the spectrum.

The following series of examples and controls, tabulated in Table I, illustrate the process of the invention. The examples were conducted in accordance with the procedure indicated in the preceding examples.

advantage, since the polyacrylonitrile modified vulcanized fiber board has greatly increased electrical resistance suitable for use with printed circuits.

Table 1

| Ex. | Cellulosic substrate | Monomer | Swelling agent | Percent swollen weight gain | Temp., °C. | Passes/microamps. | Percent swelling agent removed | Percent weight gain |
|---|---|---|---|---|---|---|---|---|
| 5 | Regenerated cellulose film [1] | None | 10% HCl in water | 72 | 25 | None | 100 | −14 |
|   | Do [1] | Vinyl acetate | None |  | 25 | 5/250 |  | −8 |
|   | Do | do | 10% HCl in water | 72 | 25 | 5/250 | 100 | 58 |
| 6 | Cheese cloth [1] | Vinyl acetate | None |  | 25 | 10/250 |  | 4 |
|   | Do | do | 10% HCl in water | 59 | 25 | 10/250 | 100 | 51 |
| 7 | Cheese cloth [1] | Acrylonitrile | None |  | 25 | 10/250 |  | 19 |
|   | Do | do | 10% HCl in water | 59 | 25 | 10/250 | 100 | 146 |
| 8 | Brown Dur-Natus wood pulp [1] | Acrylonitrile | None |  | 25 | 5/250 |  | 5 |
|   | Do | do | 10% HCl in water | 136 | 25 | 5/250 | 100 | 91 |
| 9 | Gel regenerated cellulose film [1] | Divinyl benzene | None |  | 25 | 2/25 |  | 0 |
|   | Do [1] | do | Water | 180 | 25 | 0 | 100 | 7 |
|   | Do | do | do | 164 | 25 | 2/25 | 100 | 17 |
| 10 | Gel regenerated cellulose film [1] | 50% glycidyl methacrylate in toluene. | None |  | 25 | 0 |  | 2.2 |
|   | Do [1] | do | do |  | 25 | 1/250 |  | 2.9 |
|   | Do | do | Glycerol | >40 | 25 | 1/250 | >99 | 5.8 |
| 11 | Gel regenerated cellulose film [1] | Glycidyl methacrylate | None |  | 25 | 0 |  | 2.5 |
|   | Do [1] | do | do |  | 25 | 1/250 |  | 2.7 |
|   | Do | do | Glycerol | >40 | 25 | 1/250 | >99 | 9.2 |
| 12 | Regenerated cellulose film | Vinyl acetate | Water | 104 | −78 | 5/250 | 100 | 45 |
|   | Do | do | do | 104 | 25 | 5/250 | 100 | 45 |
| 13 | Regenerated cellulose film | Acrylonitrile | 10% HCl in water | 45 | 25 | 1/250 | 100 | 8 |
|   | Do | do | do | 45 | 25 | 4/62.5 | 100 | 64 |
| 14 | Regenerated cellulose film | Vinyl acetate | 10% HCl in water | 45 | 25 | 5/250 | 100 | 72 |
|   | Do | do | do | 45 | 25 | 20/62.5 | 100 | 190 |

[1] Control.

In addition to the primary advantages of improved polymerization and increase in the grafting of the ethylenically unsaturated polymerizable monomer to the swollen cellulosic substrate, the present invention may be employed to secure a variety of other beneficial effects. For example, in fibrous and non-fibrous articles, such as paper, film and rigid and semi-rigid molded and extruded forms, it may modify such structures to improve the adhesion to various coating or laminating agents which it may be desirable to adhere thereto, to improve "slip," to produce flame retardant structures, to produce non-extractible fungicidal structures, to produce reinforced structures and to produce articles having increased resistance to heat and increased mechanical strength. It may be employed in textiles to effect ease of textile processability, overall appearance, adhesion, static propensity, hydrophilic or hydrophobic characteristics, abrasions, wear-resistance, laundering properties (dry cleaning), printability, and finishing treatments. Many other beneficial modifications may be produced, such as will occur to those skilled in the chemical arts.

More specifically, vinyl-phosphorous compounds are well known flameproofing additives for cellulosic materials and may be incorporated into cellulosic structures by the process of this invention—bis(chloroethyl) vinyl phosphonate is an example of this class. Vinyl-silane compounds are also well known waterproofing additives for the cellulosic materials which may be incorporated by the invention—vinyl dimethyl-chloro-silane and vinyl-ethoxy-dimethyl-silane are representative compounds. Graftings of less than 2% acrylonitrile to cellulosic materials are of particular advantage since it has been demonstrated that such acrylonitrile grafted cellulosic materials are highly resistant to mildew and fungi growths. And, in the manufacture of vulcanized fiber board, such as disclosed in Materials and Methods, September 1954, p. 110, by the $ZnCl_2$ process, the utilization of the process of the invention for incorporating therein polyacrylonitrile is of

I claim:
1. In the process of forming polymers on regenerated cellulose film wherein the surface of cellulose film is subjected to ionizing radiation and an ethylenically unsaturated monomer is applied to the surface of the film and is polymerized in situ as a result of the action of said ionizing radiation, the improvement which comprises swelling the regenerated cellulose film by incorporating therein at least 15% by weight, based on the weight of film, of a water-soluble non-polymerizable swelling agent for cellulose, and thereafter subjecting the surface of the resulting swollen film to said ionizing radiation.

2. The process of claim 1 wherein the dose of applied ionizing radiation is at least 0.001 watt-sec./cm.$^2$ of ionizing radiation of from 0.75 to 5 mev. energy.

3. The process of claim 1 wherein the swelling agent is an aqueous swelling agent for cellulose.

4. The process of claim 2 wherein the swelling agent is an aqueous sodium hydroxide solution.

5. The process of claim 2 wherein the swelling agent is an aqueous hydrogen chloride solution.

6. The process of claim 2 wherein the swelling agent is aqueous glycerol solution.

7. The process of claim 2 wherein said swollen structure is maintained at a temperature within the range of from 0°–50° C. during radiation.

8. The process which comprises incorporating in regenerated cellulose film at least 15% by weight of a water-soluble, non-polymerizable swelling agent for cellulose, applying to the resulting swollen substrate an ethylenically unsaturated monomer, and thereafter subjecting said swollen substrate to ionizing radiation of from 0.75 to 5 mev. energy for an exposure of at least 0.001 watt-sec./cm.$^2$.

9. In the process of forming polymers in regenerated cellulose shaped structures wherein the surface of a regenerated cellulose shaped structure is subjected to ionizing irradiation and an ethylenically unsaturated monomer is applied to said surface and is polymerized in situ as a result of the action of said ionizing radiation, the improvement which comprises swelling the regenerated cellulose shaped structure by incorporating therein initially at least 15% by weight, based on the weight of said structure, of a water-soluble, non-polymerizable swelling agent for cellulose.

References Cited in the file of this patent

UNITED STATES PATENTS

| | | |
|---|---|---|
| 210,655 | Ball | Feb. 28, 1878 |
| 1,943,000 | Chandler | Jan. 9, 1934 |
| 2,100,385 | Dreyfus | Nov. 30, 1937 |
| 2,291,616 | Fletcher | Aug. 4, 1942 |
| 2,334,236 | Arnold et al. | Nov. 16, 1943 |
| 2,352,740 | Shannon | July 4, 1944 |
| 2,424,386 | Herbert | July 22, 1947 |
| 2,512,996 | Bixler | June 27, 1950 |
| 2,712,001 | Greenlee | June 28, 1955 |
| 2,715,078 | Cohen | Aug. 9, 1955 |
| 2,764,504 | Jacobson | Sept. 25, 1956 |

OTHER REFERENCES

BNL 389 (T-73), "Progress Report on Fission Products Utilization VII," Brookhaven Nat. Lab., May 1946 (page 19 relied upon).

Sun: "Effects of Atomic Radiation on High Polymers," Modern Plastics, vol. 32, No. 1, September 1954, page 232 relied on.

Fourt et al.: Textile Research Journal, vol. XXV, No. 1, January 1955, p. 11 (9 pp. spec.).